(No Model.) 3 Sheets—Sheet 1.

L. GOULD.
SAWING AND GAINING MACHINE.

No. 290,327. Patented Dec. 18, 1883.

WITNESSES,
Amos C. Butler
Frank H. Allen

INVENTOR,
Lyman Gould (No Model.) 3 Sheets—Sheet 2.
L. GOULD.
SAWING AND GAINING MACHINE.
No. 290,327. Patented Dec. 18, 1883.
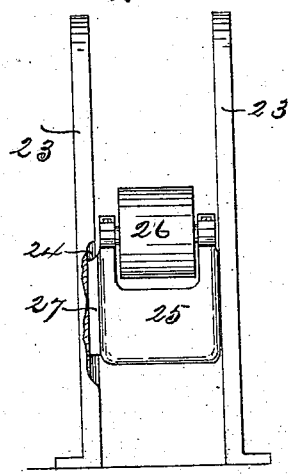
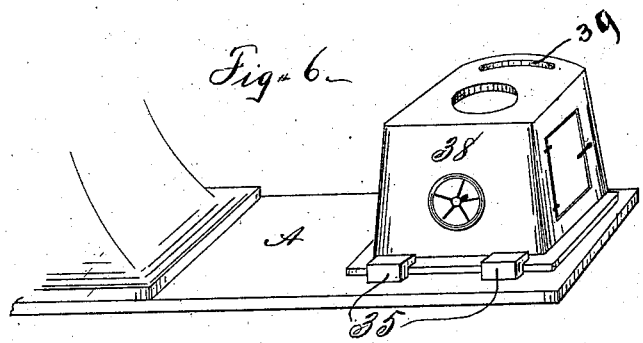
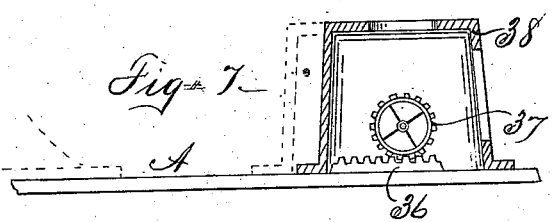
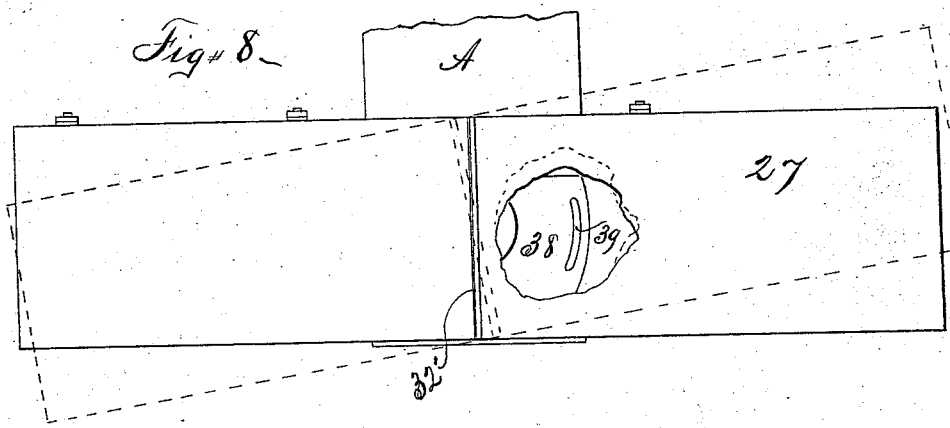
WITNESSES.
Amos C. Cutler.
Frank H. Allen.
INVENTOR.
Lyman Gould (No Model.) 3 Sheets—Sheet 3.
L. GOULD.
SAWING AND GAINING MACHINE.
No. 290,327. Patented Dec. 18, 1883.
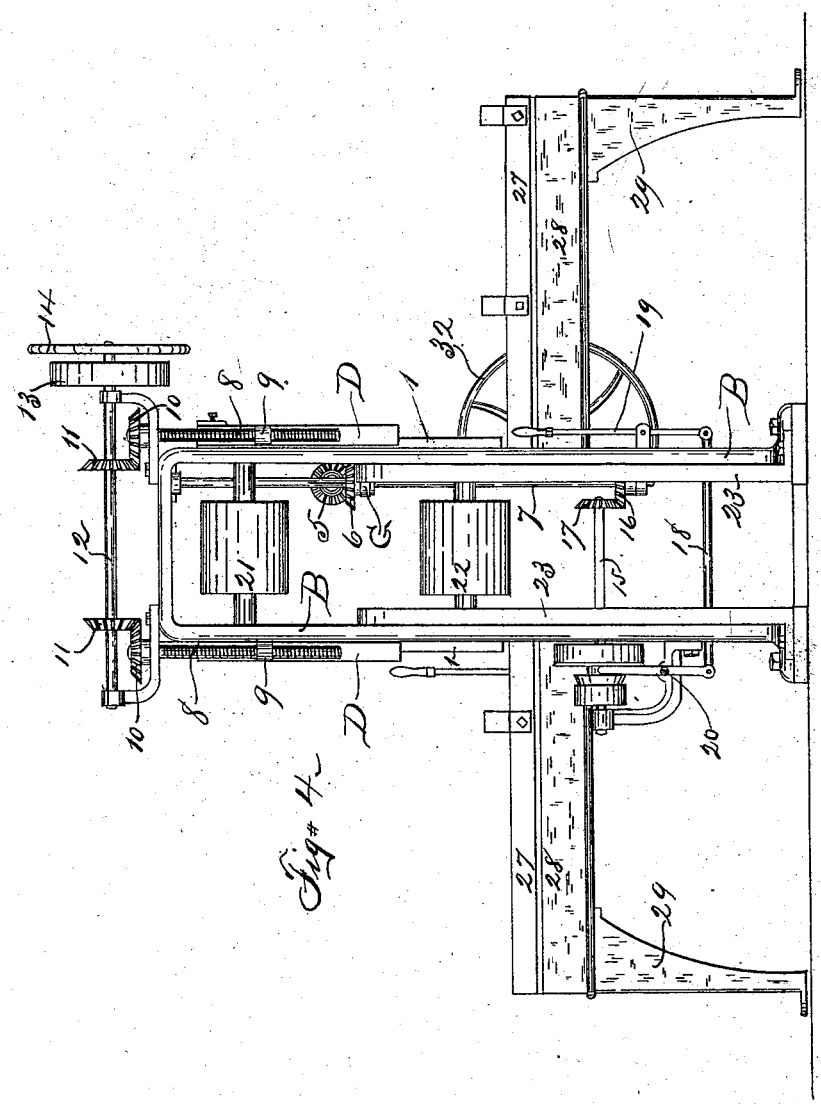
WITNESSES.
Amos C. Cutler.
Frank H. Allen.
INVENTOR,
Lyman Gould

UNITED STATES PATENT OFFICE.

LYMAN GOULD, OF NORWICH, CONNECTICUT.

SAWING AND GAINING MACHINE.

SPECIFICATION forming part of Letters Patent No. 290,327, dated December 18, 1883.

Application filed September 28, 1883. (No model.)

*To all whom it may concern:*

Be it known that I, LYMAN GOULD, of the city of Norwich, county of New London, and State of Connecticut, have invented certain new and useful Improvements in Combined Cut-Off Saws and Gainers, which improvements are fully set forth and described in the following specification, reference being had to the accompanying drawings.

My improvements relate particularly to that class of wood-working machinery known as "overhung traversing cut-off saws and gainers," my immediate object being to produce at a reasonable price a machine which shall be strong and rigid in its parts, quickly operated by automatic power-feeds which are under easy control of the operator, and in which the heaviest work may be handled and adjusted with perfect ease by a single man.

My invention consists, first, in providing suitable overhanging ways on which the saw or cutter-head arbor travels back and forth, said overhanging ways being provided with a convenient device for vertical adjustment; second, in providing a proper automatic power feeding device to carry said saw-arbor back and forth on said ways; third, in providing a cheap and efficient method of tightening the belt which drives my saw-arbor; fourth, an adjustable bed or table for supporting the work in proper position; fifth, a simple device for locking said bed or table when used with a circular saw; and, sixth, it consists of certain details of construction, as explained hereinafter.

My new form of machine is specially suited to heavy work, such as the framing of bridges, railroad-cars, &c.

Figure 1:
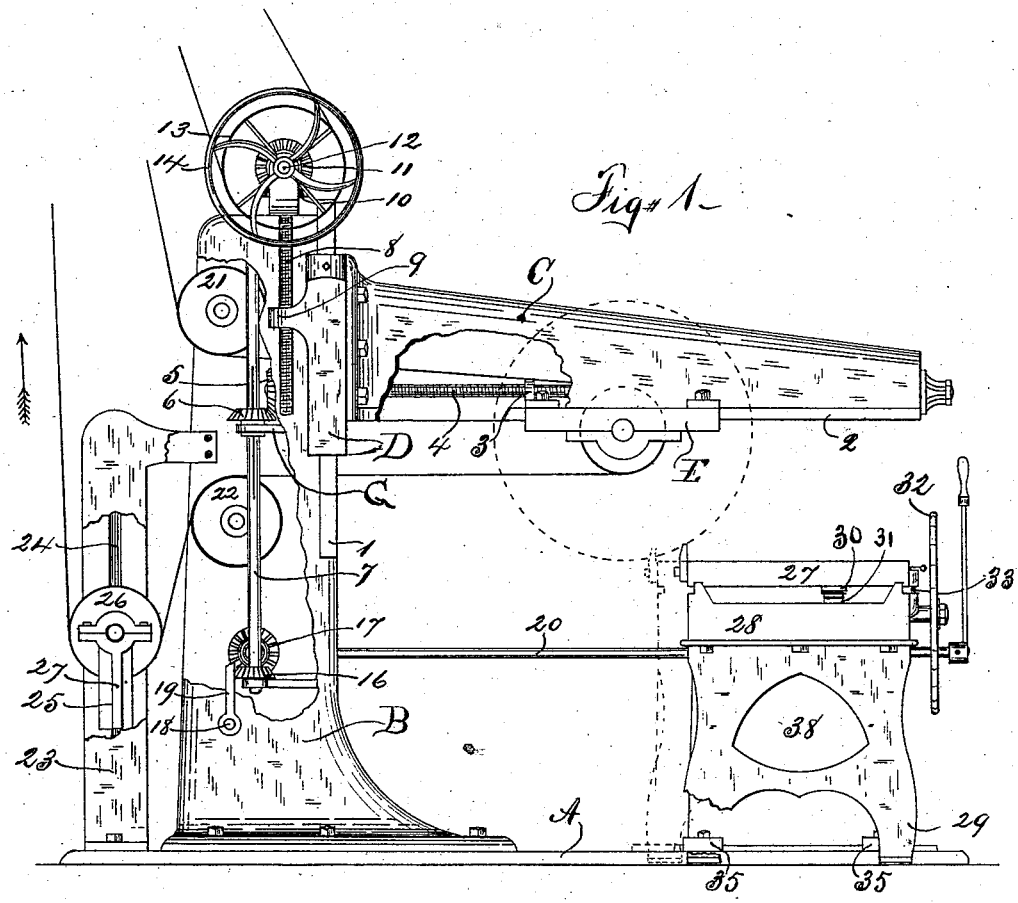
Figure 3:
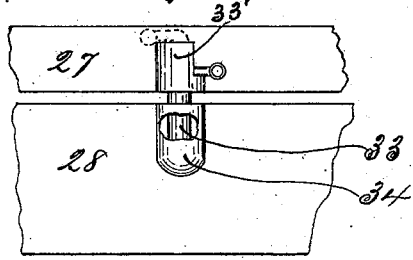
Figure 2:
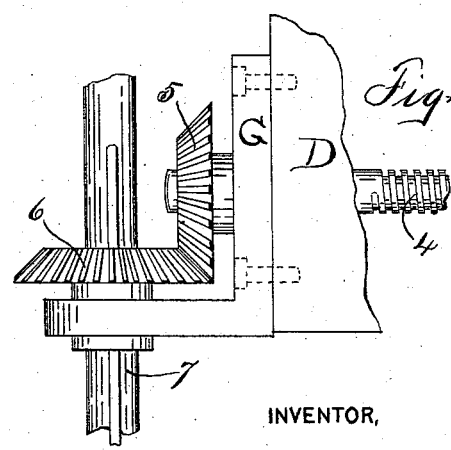

In the accompanying drawings, Figure 1 is a side elevation of my new form of machine, a portion of its upright frame being cut away to show more clearly the relative position of the feeder parts, and also shows my device for tightening the saw-arbor belt. Fig. 2 is a detached view, somewhat enlarged, of the beveled gears which transmit motion to the horizontal screw-shaft which carries the saw-arbor back and forth. Fig. 3 is a detached enlarged view of my device for holding the work-table in line with the saw. Fig. 4 is a rear elevation of my machine with the belt-tightening pulley removed. Fig. 5 is a detached rear view of my belt-tightener. Fig. 6 is a perspective view of the cast-metal box which supports the work-table bed, showing the ways and guide-lugs by means of which the supporting-box and work-table may be adjusted longitudinally on the bed A, Fig. 7 being a vertical section of Fig. 6, showing the rack and pinion for moving said box. Fig. 8 is a top or plan view of the work-table and a portion of bed A, a part of the work-table being cut away to expose the top of the supporting-box, to illustrate the means for swinging the work-table on its center, as indicated by dotted lines, for the purpose of cutting dovetails or miters.

A represents a cast-metal base arranged to receive and support the several other parts of my machine.

Bolted rigidly to A is an upright hollow cast-metal frame, B, opened at its rear side for convenience in assembling the various parts located in said hollow frame.

On the front or right-hand side of frame B, a portion of which is also opened, I provide gibbed ways 1, as shown in Figs. 1 and 2, on which travels vertically the carriage D, said carriage having secured to its outer side a projecting bracket-arm, C, open at its under side, and having ways 2, on which my saw-arbor frame E travels back and forth across the work to be sawed or grooved. The frame E, which supports the saw-arbor, has a lug, 3, extending upward inside of C, said lug being threaded to engage a feed-screw, 4, located inside of C, supported in suitable bearings at either end, and having secured to the end which projects rearward into the upright frame B a beveled gear, 5, to engage the beveled gear 6 on vertical shaft 7.

The general arrangement of gears 5 and 6 and shafts 4 and 7 is more clearly shown in Fig. 2, in which G represents a right-angular knee or bracket, one arm of which is secured to the inner side of carriage D, the other arm supporting the beveled gear 6. The carriage D, as it travels up or down on ways 1, carries with it said bracket G and gears 5 and 6, the gear 6 fitting loosely and sliding on the splined shaft 7. By this means I am able to transmit power and motion from the vertical shaft 7 to the horizontal shaft 4 in whatever position the carriage D and arm C may be.

The general arrangement of the mechanism for raising and lowering the carriage D is similar to that commonly used in planers to raise and lower the tool-carriage, consisting of screw-shafts 8, engaging threaded projections 9 on carriage D, and having at their upper end beveled gears 10, to engage corresponding gears 11 on horizontal shaft 12. Shaft 12 carries a driving-pulley, 13, to control and operate the upfeed by power, the downfeed being controlled by a hand-wheel, as at 14.

Instead of hand-wheel 14, a second driving-pulley with crossed belt to reverse the feed could be used, if so desired.

The vertical shaft 7 is connected with the horizontal shaft 15 by beveled gears 16 and 17, said shaft having on its outer end, as shown in Fig. 4, pulleys carrying straight and crossed belts, and a suitable friction clutch or shipper to operate the same.

For convenience a shipper-rod, 18, passes through the frame B, connecting with the lever-handle 19, and a second rod, 20, with suitable connections, passes forward to the table which supports the work. These devices bring the entire mechanism at all times within easy reach and control of the operator.

Running in proper bearings in frame B are idle-pulleys 21 22, provided as guides for the belt which drives the saw-arbor.

At 23 is a frame, made, preferably, of cast metal, bolted at its upper end securely to the upright frame B and at its lower end to base A, having grooves 24, forming vertical guides for the weighted pulley-frame 25, which is one of the important features of my invention.

Attached to the boxes or bearings in which pulley 26 runs is a weighted cast-metal frame, 25, having side extensions or ribs, 27, fitting loosely in the vertical grooves 24, above referred to.

As the saw-arbor frame is carried outward by the feed-screw 4, it becomes necessary to provide a means for maintaining a proper degree of tension on the driving-belt, so that it cannot slip while in the act of sawing or cutting heavy work. I find the self-adjusting weighted pulley 26 just described simple, cheap, and efficient, working automatically, and providing at all points the same degree of tension. The belt which drives the saw-arbor passes downward from the counter-shaft across the lower side of idle-pulley 21, thence around the saw-arbor pulley, and back to the top of idle-pulley 22. From 22 it passes downward around the belt-tightening pulley 26 and back to the counter-shaft, traveling in the direction indicated by the arrow. When the machine is set in motion, the arbor-frame E travels outward, the weighted frame 25 and pulley 26 ride upward in the grooves 24; but when said arbor-frame is fed backward the weighted frame and pulley move steadily downward, working automatically, and keeping the belt at a uniform tension.

As a convenient means for handling heavy work, I have provided the adjustable table 27, of sufficient size and strength to support the heaviest class of work. Said table is supported by ways on bed 28, which in turn is supported by the cast-metal box 38, and when in use by legs 29.

On the under side of 27, and attached rigidly to it, is a toothed rack, 30, which engages gear 31, said gear being carried by a shaft hung in proper bearings in the bed 28, and having on its outer end a hand-wheel, 32, by means of which the table 27 may be finely adjusted to bring the work into line with the saw or cutter-head.

In nearly all of the machines used heretofore the position of the saw or cutter relative to the work to be formed has been such that the working-lines have been hidden from the operator's sight, so that in cutting grooves in cross-section or in sawing it has been impossible to work closely to lines, and in consequence such grooves have been either a trifle too narrow or a little too wide. The work in my new form of machine is so held that the working-lines are on top and at all times in plain sight, and, with the fine adjustment afforded by the rack 30 and pinion 31, one is enabled to work closely to said lines.

When using a circular saw, it becomes necessary to provide a groove, 32', in the table 27, so that a clean cut may be made through the piece to be sawed, yet the saw must not touch the iron table. In order that said groove may be kept in line with the saw, and to keep said saw from accidentally coming in contact with the table as it passes across it, I provide a bolt, 33, working in lugs forming a part of table 27 and bed 28, as shown in Fig. 3, said lugs being drilled to receive said bolt. When the groove 32' is directly under or in line with the saw, the holes in lugs 33' and 34 are in vertical alignment, and by dropping the bolt into 34 the table and bed are held firmly in place until the bolt is again withdrawn.

The legs of bed 28 do not rest directly on the floor, but are of such height that said bed may be carried toward the upright frame B, the box 38, which supports 28, being made adjustable by means of the guide-blocks 35, rack 36, and pinion 37, as before stated. The top or upper face of box 38 is preferably flat, with a circular central hole to receive a corresponding circular projection or disk on the under side of the bed 28, a bolt in said bed projecting downward through a slot, 39, having on its lower end a nut, which, when the bed and work-table are adjusted at any desired angle, is set up to hold said work rigidly in position. The legs 29 may then be blocked up by wedges or thin plates of metal inserted between them and the floor.

The various devices described and shown furnish means for horizontal, vertical, and longitudinal adjustment, and for swinging the work for cutting miters, &c., all being under the control of a single operator.

Having thus described my invention, I claim as new and wish to secure by Letters Patent—

1. In a combined cut-off saw and gainer, a suitable upright supporting-frame, as at B, having ways 1, a carriage carrying an overhanging arm, C, adapted to slide vertically on ways 1, said arm being provided with ways on which the saw-arbor frame may travel forward and back across the work to be cut or grooved, all in combination, substantially as described.

2. In combination with frame B, the arm C, having means for vertical adjustment on said frame, the arbor-frame E, having the threaded lug 3, and a horizontal screw-shaft engaging said threaded lug, and adapted, when rotated, to carry the saw-arbor out and back on ways 2 on arm C, as hereinbefore described.

3. In combination with upright frame B, arm C, arbor-frame E, adapted to travel back and forth on ways 2 on arm C, screw-shaft 4, horizontal shaft 12, carrying gears 11 and pulleys 13 14, and the vertical shafts 8, with gears 10, said screw-shafts 8 being arranged to engage threaded lugs 9 for the purpose of raising or lowering arm C, as described.

4. As a means for providing a uniform tension for the belt which drives the saw-arbor, and in combination with a saw-arbor frame having both vertical and horizontal adjustment, and with one or more suitable guide-pulleys, as at 21 22, a weighted pulley traveling in suitable guide-slots, and arranged to automatically take up the slack of said driving-belt, substantially as described.

5. In combination with an upright supporting-frame and arm C, having means for vertical adjustment on said frame, the traveling arbor-frame, the screw-shaft 4, engaging and operating said arbor-frame, gear 5, the vertical splined shaft 7, and gear 6, said gear 6 being held in engagement with gear 5, and arranged to slide on shaft 7, as described, and for the purpose set forth.

6. In combination with an upright supporting frame and arm C, having means for vertical adjustment on said frame, the traveling arbor-frame, screw-shaft 4, gear 5, vertical splined shaft 7, carrying gear 6, beveled gears 16 17, and the horizontal shaft 15, having on its outer end pulleys with straight and crossed belts, all arranged and operated as and for the purpose specified.

7. In combination with the upright frame B, arm C, having means for vertical adjustment on said frame, the arbor-frame arranged to travel automatically on ways 2, a belt-tightening device, and a suitable table, as at 27 28, for supporting the work in proper position to be sawed, cut, grooved, or otherwise formed, as and for the purpose specified.

8. In combination with the upright frame B, arm C, having means for vertical adjustment, the arbor-frame, arranged to travel on ways 2, a suitable belt-tightener, and the table 27, so constructed that it may be adjusted laterally and also swung on its central support, for the purpose of cutting dovetails, miters, &c., as and for the purpose specified.

LYMAN GOULD.

Witnesses:
FRANK H. ALLEN,
AMOS C. CUTLER.